United States Patent [19]
Matsuo

[11] 3,937,407
[45] Feb. 10, 1976

[54] MULTIPLE STRAP SHOCK ABSORBER

[75] Inventor: Jon T. Matsuo, El Centro, Calif.

[73] Assignee: The United States of America as represented by the Secretary of the Navy, Washington, D.C.

[22] Filed: May 24, 1974

[21] Appl. No.: 473,252

[52] U.S. Cl. ........ 244/151 R; 188/1 C; 280/150 SB
[51] Int. Cl.² ......................................... B64D 17/36
[58] Field of Search ............... 244/151 R, 147, 152; 188/1 C; 297/386; 280/150 SB

[56] References Cited
UNITED STATES PATENTS

| | | | |
|---|---|---|---|
| 2,471,166 | 5/1949 | Neff | 244/151 R X |
| 2,987,279 | 6/1961 | Gray | 244/151 R |
| 3,098,629 | 7/1963 | Fonden et al. | 188/1 C X |
| 3,302,973 | 2/1967 | Ravau | 244/151 R X |
| 3,804,698 | 4/1974 | Kinloch | 244/151 R X |

FOREIGN PATENTS OR APPLICATIONS

| | | | |
|---|---|---|---|
| 334,084 | 8/1930 | United Kingdom | 244/151 R |

*Primary Examiner*—Trygve M. Blix
*Assistant Examiner*—Barry L. Kelmachter
*Attorney, Agent, or Firm*—R. S. Sciascia; G. J. Rubens

[57] ABSTRACT

An improved energy and shock absorber is provided using one standard off-the-shelf textile material for all the strap components having the same configuration and composition and varying only in length. Such a design enables the shock absorber to be fabricated and/or repaired economically and expeditiously at any installation or facility that has available a commercial sewing machine. The magnitude of shock absorption can be varied without the need for any research and development effort, and by operating personnel.

10 Claims, 17 Drawing Figures

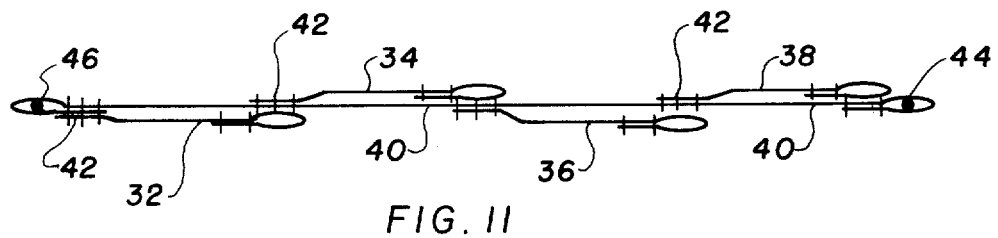
FIG. 11
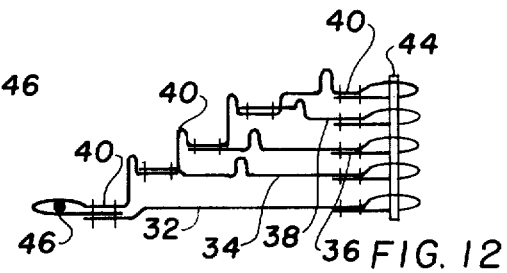
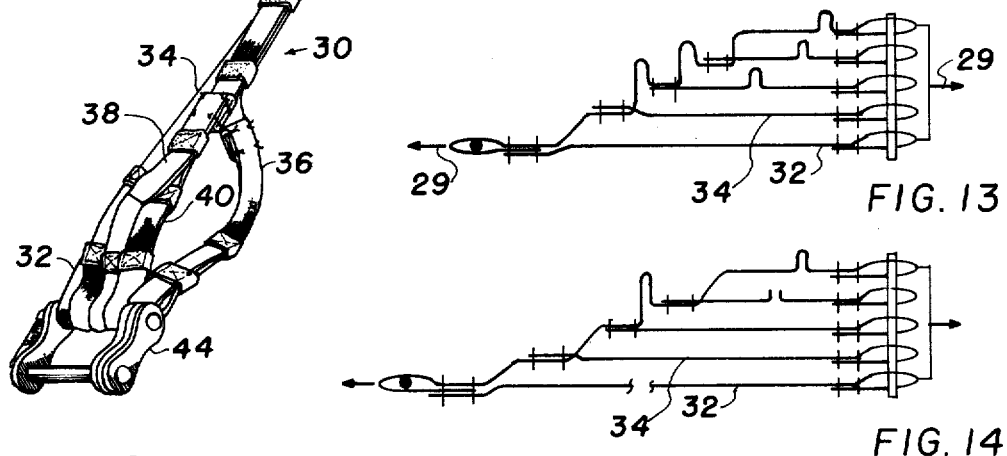
FIG. 12
FIG. 10
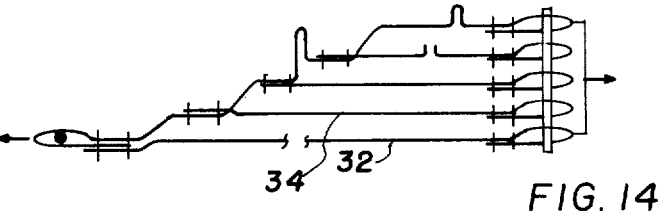
FIG. 13
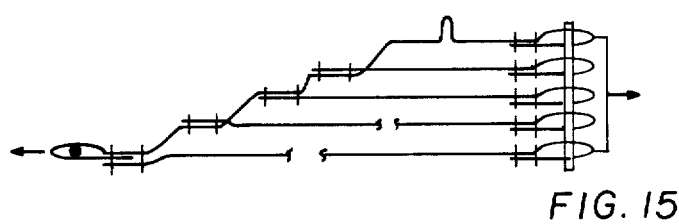
FIG. 14
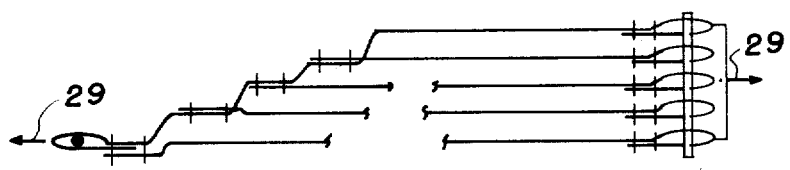
FIG. 15
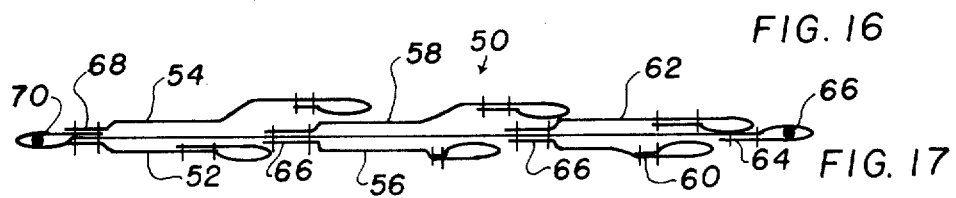
FIG. 16
FIG. 17

MULTIPLE STRAP SHOCK ABSORBER

BACKGROUND OF THE INVENTION

This invention relates to strap shock absorbers designed primarily for parachutes, but it is to be understood that the invention apparatus can be used for any purposes for which it is found applicable.

The use of shock absorber webbing for parachutes and other uses is well established in the energy and shock absorption art. For the most part, such prior art shock absorber systems are composed of supplemental straps of special sizes and material to provide a sequential and intermittent breaking to absorb the shock force to a safe level to be handled by the basic strap. An example of the prior art shock absorber system is U.S. Pat. No. 3,302,973. This type of construction requires an inventory of special straps, and fabrication and repair of the shock absorber system is impractical at most field installations. In addition, the supplemental straps are dependently secured together to the basic strap at a common point enhancing the possibility that repetitive tearing of the straps will degrade the shock absorber system.

Other prior art shock absorbers employ stitch-rupturing textile systems which by experience provide inconsistent and nonrepeatable results. This construction is represented by the U.S. Pat. Nos. 2,352,036 and 3,563,498.

SUMMARY OF THE INVENTION

The novel energy and shock absorber is fabricated with tear straps made of the same standard, commercially available strap material, such as webbing. All the tear strap components have an identical cross-sectional configuration, differing only in length. The basic strap may or may not be made of the same material as the tear straps. Such an arrangement makes it possible to construct and repair the absorbers at field, land, and shipboard installations, utilizing conventional sewing machines by relatively unskilled operators.

In the several illustrated modifications, it should be noted that at least one end of each strap is anchored independently by a looped portion to one of the load clevis fittings, with the straps oriented in side-by-side relationship for a portion of the length thereof. The only variation in the various straps is in length, being graduated so as to provide a successive parting of the straps to produce a graduated attenuation of the shock forces continuously throughout the shock absorbing period. The length of the straps are predetermined so that the tensile load force on one strap is applied initially to the next longer strap to ensure a continuous and smooth force transfer.

The unique construction of the shock absorber enables the degree of shock absorption to be readily varied by choosing the desired number of rupturable straps, making the absorber versatile in use for many different applications.

Although the shock absorbers illustrated are adapted for parachute systems, it is obvious that they may be employed in any system requiring shock force attenuation.

STATEMENT OF THE OBJECTS OF THE INVENTION

An important object of this invention is to provide a shock absorber having tear members constructed of the same commerically available material and cross-sectional configuration, and a corollary object is to enable the shock absorber to be fabricated by a conventional sewing machine by relatively inexperienced operators.

Another principal purpose is to construct a shock absorber that will have greater integrity in that the ends of the tear members are independently anchored to their respective fittings.

Still another important object is to provide a shock absorber which is relatively simple in construction; easy to understand; and easy on which to conduct periodic maintenance inspections thereon.

A further object is to provide a shock absorber which can be easily modified by adding or eliminating tear members for adaption to different load forces.

Other objects, advantages and novel features of the invention will become apparent from the following detailed description of the invention when considered in conjunction with the accompanying drawings.

BRIEF DESCRIPTION OF THE DRAWINGS

FIG. 10 is a top perspective view of a second modification of the five-strap member shock absorber shown in a relaxed condition.

FIG. 11 is a diagrammatic illustration of the shock absorber of FIG. 10 with the strap members extended in a stretched-out condition prior to the applications of the force to be absorbed.

FIGS. 12–16 diagrammatically illustrate the progressive application of the force to the absorber strap members as they are successively broken to absorb the applied force.

FIG. 17 is a diagrammatic illustration of a third modification of the novel shock absorber utilizing seven-strap members.

DESCRIPTION OF THE PREFERRED EMBODIMENT

Figure 1:
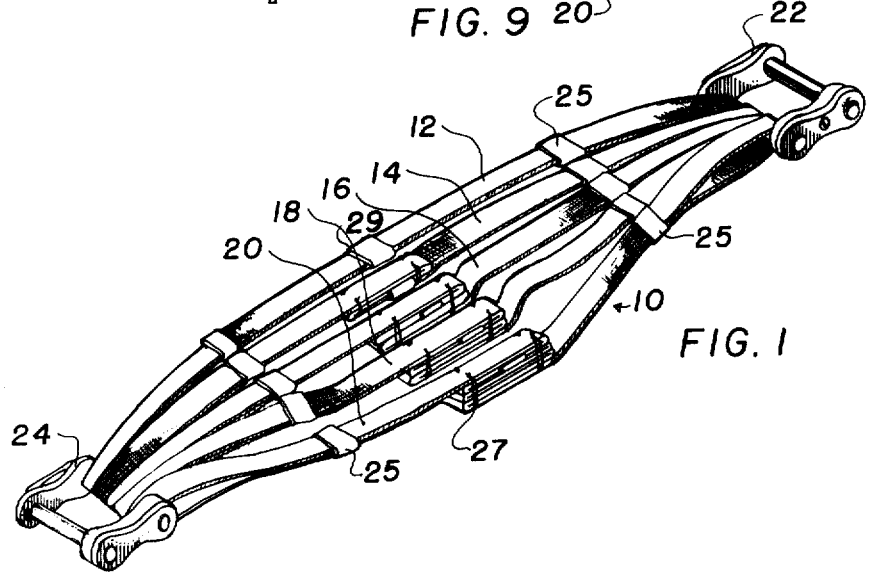
FIG. 1 is a top perspective view of a five-strap member shock absorber illustrated assembled in a relaxed condition.

Referring to the drawings where like reference numerals refer to similar parts throughout the Figures there is shown in FIG. 1 one embodiment of the novel shock absorber 10 in which four tear strap members 12, 14, 16, and 18 are employed. The fifth strap 20 is a basic strap which remains unbroken if the particular applications require such integrity. The precise number of tear members utilized in the shock absorber will vary, depending on the particular application and the magnitude of the shock force to be attenuated. The opposite ends of each tear members are connected by integral loops in the strap ends to conventional clevis-type, load attaching fittings 22 and 24. The looped ends in the respective straps are closed by stitching 25 or the like. An important consideration in this invention is that each of the tear straps 12 to 18 are constructed of the same identical basic material, varying only in length. Basic strap 20 may or may not be made of the same material as the tear straps. Accordingly, the shock absorbers can be designed and fabricated of materials, such as webbing, which are readily available at any installation or facility having available commercial sewing machines, even at advanced bases, and by operators having only basic skills.

The length of each tear strap are sized to include but are not limited to the following operational and textile requirements and characteristics: working speed; textile elongation and rupturing properties; force overlap between members; and forces limitations of the retarded load.

The excess strap material in each strap member is packaged by folding, which folds are temporarily secured by suitable tacking 27 that is broken by the applied load force to enable the respective straps to be elongated until broken.

Another important consideration is the arrangement of independently securing at least one end of each of the tear strap members and the basic strap to the respective clevis fitting 22 or 24 with the straps in lateral, side-by-side arrangement. Thus each strap is secured to the respective clevis fitting independently of the other to enhance the integrity of the absorber system. In addition, such arrangement simplifies visual inspection of the system. Attaching the ends of the tear straps by looped ends is a simple and effective means, and underscores the important feature of the invention of making the absorber system capable of being easily and readily fabricated with conventional sewing machines and available personnel without special training.

Figure 2:
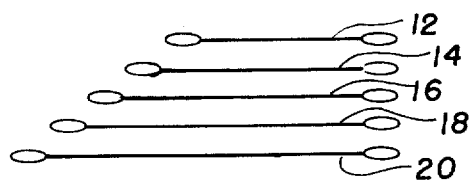
FIG. 2 is a diagrammatic illustration of the shock absorber of FIG. 1 with the straps members extended in a stretched-out condition prior to the application of a load force to be absorbed.
Figure 3:
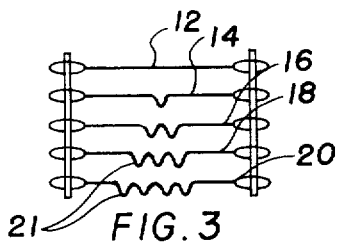
FIGS. 3–9 diagrammatically illustrate the progressive application of the force to the absorber strap members as they are successively broken to absorb the applied forces.
Figure 6:
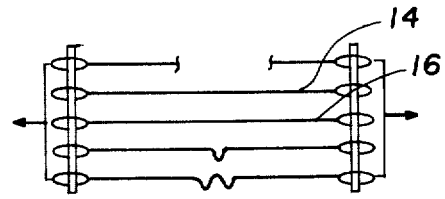

FIG. 2 diagrammatically illustrates shock absorber 10 of FIG. 1 with each strap in a fully stretched-out relaxed position showing the graduated length of the respective strap members. FIG. 3 diagrammatically illustrates the packaged configuration of the straps members as in FIG. 1 before the application of the applied force. The slack in straps 14 to 20 is represented graphically by waved lines 21.

Figure 4:
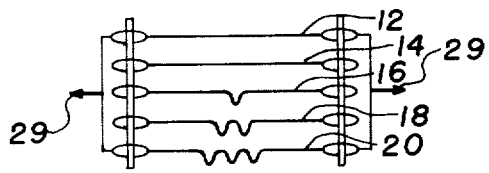
Figure 7:
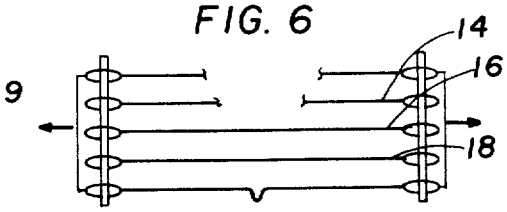

FIGS. 4 to 9 illustrate the sequential operation of the individual strap members when the load force is applied, as indicated by arrows 27. In FIG. 4 tear strap 12, the shortest length strap, is the first and only member under the tensile force, and has elongated to the desired length (any percentage of the maximum elongation) before rupturing. However, it should be noted that the next longer strap 14 with all of its slack dissipated, is starting to stretch and is beginning to absorb part of the load force. This feature of the invention is important in effecting a smooth force transfer, and occurs throughout the operational sequences as will be described. Notice that as the distance between clevis fittings 22 and 24 increase, the magnitude of the slack in strap members 16 to 20 correspondingly decrease by rupturing of tacking lines 27.

Figure 5:
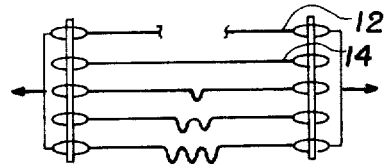
Figure 8:
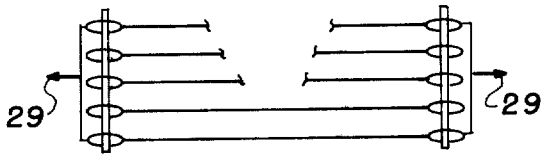

In FIG. 5, the applied force has caused strap member 12 finally to rupture, and the entire applied force is transferred to the next strap 14, which as noted before is partially tensioned.

Figure 9:
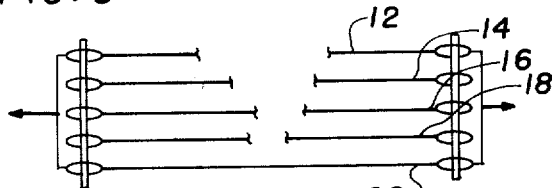

The above described sequence of straining the shorter strap, and of transferring the load to the next longer strap already under tension, upon the rupture of the former strap is repeated in FIGS. 6, 7, 8, and 9. In FIG. 9 all the tear straps 12 to 18 have ruptured and the attenuated load is finally transferred to basic strap 20, which in this specific application is structurally able to assume the load to maintain the integrity of the system. Thus, an important feature of the invention is that the applied load force has been absorbed in sequential steps by the four tear straps, the load having transferred between the respective tear members in a smooth and continuous manner.

FIG. 10 illustrates a second modification of the invention shock absorber 30 suitable for use in an application where space at one end of the system is limited. A diagrammatic fully stretched-out side elevation of absorber 30 is illustrated in FIG. 11. As in FIG. 1, absorber 30 is also represented as a five-strap absorber with four tear strap members 32, 34, 36, and 38, and a basic strap member 40, should one be required. Shock absorber 30 differs in that all of the tear members may be of identical length, although they need not be, however, their effective length gradually varies depending on the location on the basic strap 40 that one common end of each tear strap is secured, such as by stitching 42. As shown in FIG. 11 one end of each of the tear straps are secured to both sides of the basic strap 40 at alternately spaced positions, and are broken in that same sequence. The opposite common ends of the individual tear straps 32 to 38 have looped ends anchored to clevis fitting 44, as is the basic strap. The other end of basic strap, and only that strap, is secured to clevis fitting 46 by a looped end.

FIG. 11 diagrammatically illustrates shock absorber 30 in a fully stretched-out condition not connected to the load. FIG. 12 illustrates the shock absorber of FIG. 11 packaged for attachment to the load through the clevis attachments 44 and 46, but, prior to the application of the load force. FIG. 13 shows the shock absorber system functioning with tear strap member 32 subject to tension under load force 29 and elongated to the desired length (any desired percentage of the maximum elongation) before rupturing, part of the load force being taken up by strap 34 which has begun to stretch.

In FIG. 14 strap 32 has finally ruptured, transfering the entire load to strap 34. FIGS. 15 and 16 indicate similar situations with the successive rupturing of straps 34, 36, and 38 until only basic strap 40 remains intact in a stretched-out position when it assumes the entire load (not illustrated).

FIG. 17 represents a third modification of the novel shock absorber 50 showing a seven-strap system of which 52 to 62 are tear straps, and 64 is the basic strap, if continuity is required in the particular installation. This embodiment is similar to the shock absorber in FIG. 10 in that only one common end of each tear strap is anchored to clevis fitting 66, with the other common end of each tear strap secured by stitching 68 to the basic strap. The opposite end of only basic strap 64 is secured to the other clevis fitting 70. However, shock absorber 50 differs from shock absorber 30, in that the former comprises three pairs of tear straps, one end of the straps in each pair, i.e. 52 and 54, being anchored by stitching at the same point on opposite sides of the basic strap. Each pair of tear straps are anchored at staggered locations along the basic strap 64 from clevis 70. The straps of each pair being of unequal and preselected length, with the respective straps of each pair on the same side of the strap being the same length. This arrangement ensures that the active tear strap under tension and about to break, has transferred a portion of the load force to the tear strap next in length prior to its breaking. This modus operandi of obtaining a smooth transfer of the load is the same throughout the various embodiments. Thus, in the operation of shock absorber 50 in FIG. 17, tear strap 52 is first to be tensioned and when substantially stretched, tear strap 54 will be partly tensioned to share the load with strap 52. When tear strap 52 finally breaks, the full load will be assumed by the pretensioned tear strap 54. When tear strap 54 is substantially stretched, tear strap 56 will be partly tensioned, and the sequence continues until all the tear straps have broken and the full reduced load force is safely assumed by basic strap 64.

The three illustrated embodiments of the novel shock absorber can be easily manufactured from the same webbing material by conventional sewing machines and without specially qualified personnel. Most important, the individual tear straps being independently anchored, ensures a more reliable shock absorbing system. This reliability is further enhanced by the technique of pretensioning the tear strap next to be broken, enabling the gradual transfer of the load successively from one tear strap to the other. This results in a smoother operating shock absorbing system which further enhances its reliability.

Obviously many modifications and variations of the present invention are possible in the light of the above teachings. It is therefore to be understood that within the scope of the appended claims the invention may be practiced otherwise than as specifically described.

What is claimed is:

1. A shock absorber comprising a pair of spaced load attaching fittings;
   a plurality of elongate tear members extending between and having their ends operatively connected between said fittings;
   all of said tear members being made of the same material having equal cross-sections and predetermined physical characteristics;
   said tear members extending for a portion of their length substantially in a common plane, in lateral side-by-side relationships;
   said tear members each being progressively longer in effective parting length;
   the effective lengths of said tear members being constructed so that a tensile force between said fittings is applied to at least two adjacent tear members simultaneously causing the force to be transferred between the tear members smoothly and continuously as the tear members are successively parted.

2. The shock absorber of claim 1 wherein a continuous and uninterrupted basic elongated member is connected at each end to a corresponding fitting.

3. The shock absorber of claim 2 wherein the length of the tear members are of a selected predetermined length in association with the basic elongate member so that the shock forces applied to one of the tear members are applied initially to the next longer tear member prior to the parting of the former tear member ensuring a continuous and smooth force transfer successively to each tear member throughout the operation of the absorber.

4. The shock absorber of claim 2 wherein the excessive length in each tear member is detachably bundled together to be readily unravelled by said force, and all of said tear members in a relaxed condition are effectively the same length.

5. The shock absorber of claim 4 wherein said basic elongated member has a greater tensile strength than the tear members.

6. The shock absorber of claim 5 wherein both ends of each tear member are individually connected to the respective fittings through a looped portion.

7. The shock absorber of claim 2 wherein said basic member extends the entire distance between said fittings, said basic member being made of different material than the tear members and the remaining tear members being shorter in length, another end of each tear member being secured to an intermediate point on the basic member.

8. The shock absorber of claim 7 wherein the tear members are progressively shorter in length than the basic member.

9. The shock absorber of claim 3 wherein said basic member extends the entire distance between said fittings, and the remaining tear members are arranged in pairs, secured at one of the ends to spaced points on the basic member, the other ends of the tear member in each pair being attached to the basic member at the same location.

10. The shock absorber of claim 9 wherein one tear member of each pair are of the same size, and are different in length from the other tear member in each pair.

* * * * *